Figure 1:
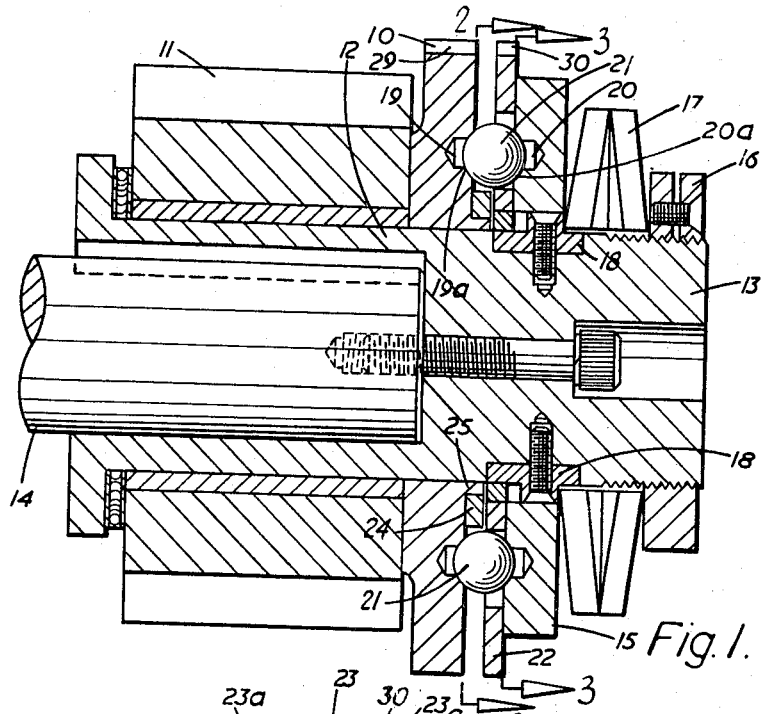

INVENTORS.
OLAF JOHN BARCLAY ORWIN
DAVID JOHN FORTUNE

BY Kurt Kelman
AGENT

INVENTORS.
OLAF JOHN BARCLAY ORWIN
DAVID JOHN FORTUNE
BY
Burt Kelman
AGENT

United States Patent Office 3,305,058
Patented Feb. 21, 1967

3,305,058
OVER-LOAD CLUTCH
Olaf John Barclay Orwin, Birmingham, and David John Fortune, Weston, Bath, England, assignors to Fisher & Ludlow Limited, Tipton, England, a British company
Filed Mar. 2, 1965, Ser. No. 436,603
Claims priority, application Great Britain, Mar. 11, 1964, 10,233/64
4 Claims. (Cl. 192—56)

This invention relates to over-load clutches of the kind comprising driving and driven clutch members coupled together by torque transmitting balls which engage in torque transmitting openings provided in axially opposed faces of said two members, said two members being mounted for relative axial displacement away from one another against loading means urging said members towards one another, so as to permit of the balls moving out of torque transmitting engagement with said openings on more than a predetermined torque being applied to the driving member, the clutch being provided with a ball returning part formed with ball receiving slots, one portion of each of which slots is in one relative position of the two clutch members in register with a torque transmitting opening in both of said clutch members, with one end of each slot being out of register with the torque transmitting openings of both clutch members for all relative rotational positions thereof.

The invention is an improvement in or modification of the invention the subject of our prior Patent No. 3,095,955 in the specification of which we have described and claimed an over-load clutch of the foregoing kind, such clutch comprising driving and driven clutch members coupled together by torque transmitting balls which engage in torque transmitting openings provided in axially opposed faces of said two members, said two members being mounted for relative axial displacement away from one another against loading means urging said members towards one another, so as to permit of the balls moving out of torque transmitting engagement with said openings on more than a predetermined torque being applied to the driving member, with one of said two clutch members being provided with a ball retaining part which rotates with the said one member, which ball retaining part is formed with ball receiving slots, one portion of each of which slots leads into a corresponding torque transmitting opening of said one clutch member, with one end of each slot being out of register with the torque transmitting openings of both clutch members for all relative rotational positions thereof, and the opposed mouths of the openings of both clutch members having a diameter less than the diameter of the balls, and the slots including the portion thereof adjacent the torque transmitting openings having a width greater than the diameter of the balls, the arrangement being such that the balls are free to move out of their torque transmitting position by a rolling movement before being subjected to the guiding action of the slots in displacing the balls along the slots into a position in which they are out of register with said torque transmitting openings.

In the preferred embodiment illustrated in the drawings accompanying the prior specification, the ball retaining part is so mounted as to rotate with the driven member of the clutch. Such an arrangement entails the disadvantage that when clutch disengagement occurs and the driving member is still rotating with the balls out of register with the openings of the two members, relative sliding movement is occurring between the balls and the edges of the slots in the ball retaining part which is connected to the driven member of the clutch.

This relative sliding movement between the balls and the sides of the slots of the ball retaining part is not material if the torque to be transmitted are relatively low, but in certain applications in which the torques to be transmitted are comparatively high so that the spring or other loading pressure on the clutch must also be high, we have found that the pressure to which the balls are subjected in the disengaged position may be such under the foregoing circumstances as to lead to undesirably rapid wear of the balls or other surfaces with which they engage.

With a view to overcoming the disadvantages of the aforementioned arrangement described in the prior specification which obtained in certain particular applications of the over-load clutch, we further described in the prior specification an alternative arrangement in which the ball retaining part is formed as an element entirely separate from the driving and driven members of the clutch, which element is free to rotate relative to the two clutch members, friction means being provided for controlling the rate of rotation, for the specific purpose of ensuring that at the instant of disengagement relative movement occurs between the balls and the slots in the ball retaining element to ensure that the balls move into a position in which they are out of register with the openings in the driving and driven clutch members.

We have found it difficult satisfactorily to control the rotational movement of the ball retaining element frictionally for the foregoing purpose. For this to be effective a very carefully adjusted frictional pressure is required and it is not easy to obtain this adjusted pressure in the first place or to maintain it under service conditions.

The present invention has for its object the provision of an alternative arrangement which avoids the aforementioned undesirable wear which may occur with certain applications of the arrangement of the prior specification and which also avoids the difficulty of endeavouring frictionally to control the rotational movement of the ball retaining element.

According to the present invention the ball retaining part is constructed as an element separate from both the driving and driven clutch members mounted for free rotational movement relative to both said members, the arrangement being such that in the clutch disengaged position in which the balls are out of register with the torque transmitting openings and are in rolling engagement with the opposed faces of the two clutch members, the ball retaining element is free to rotate relative to the two clutch members at the speed at which the balls themselves roll bodily about the clutch axis, and one of the two clutch members has connected thereto to rotate therewith ball displacing means comprising a plurality of ball engaging abutments spaced circumferentially about the axis of rotation of the clutch and adapted on relative rotational movement occurring between the two clutch members each to engage with one of the several balls and positively to displace the same in a direction along the length of the associated slot in the ball retaining element to a position in which the balls are out of register with the torque transmitting openings in both the driving and the driven clutch member.

For instance, the ball displacing means may comprise a star cam having a plurality of lobes corresponding in number to that of the balls and of the slots in the ball retaining element and spaced angularly by the same pitch distance as that of the slots, with the dwells of the star shaped cam being each in radial alignment with a corresponding torque transmitting opening of the clutch member to which the star cam is connected, the arrangement being such that on clutch disengagement occurring each of the several balls is engaged by a corresponding star cam lobe to displace the ball positively along the slots of the ball retaining element into the out of register position.

The star cam may be connected either to the driving or to the driven member of the clutch so as to rotate with one or the other of the two members.

Figure 2:
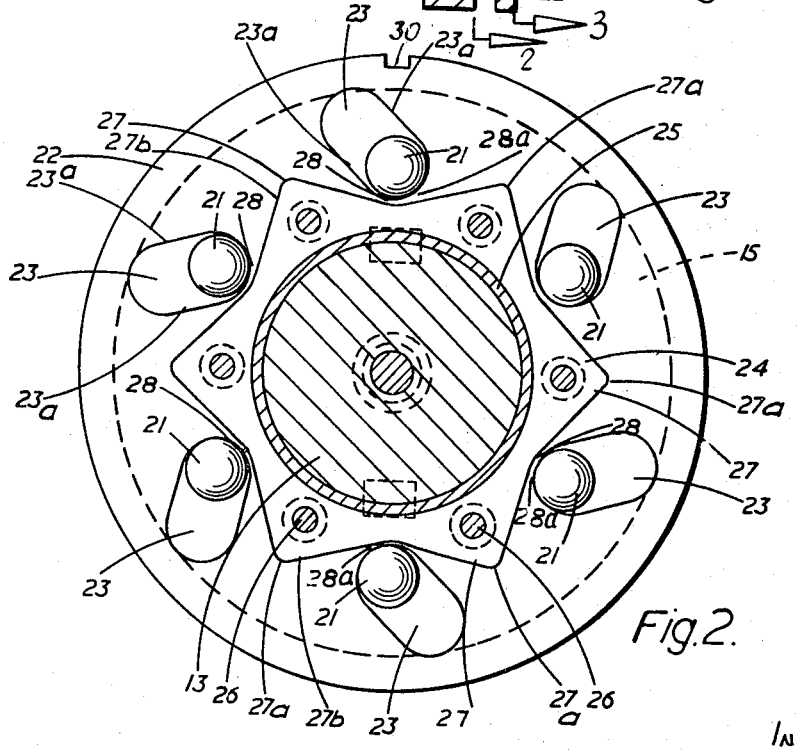
Figure 3:
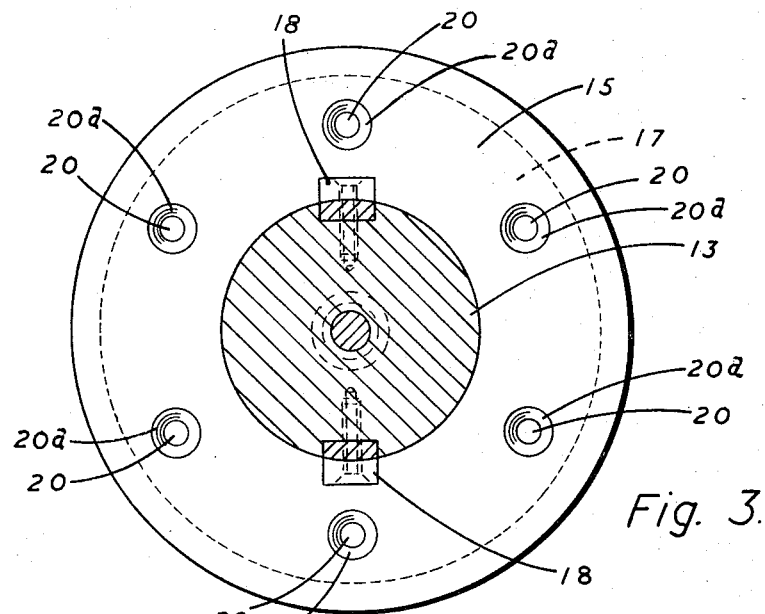
Figure 4:
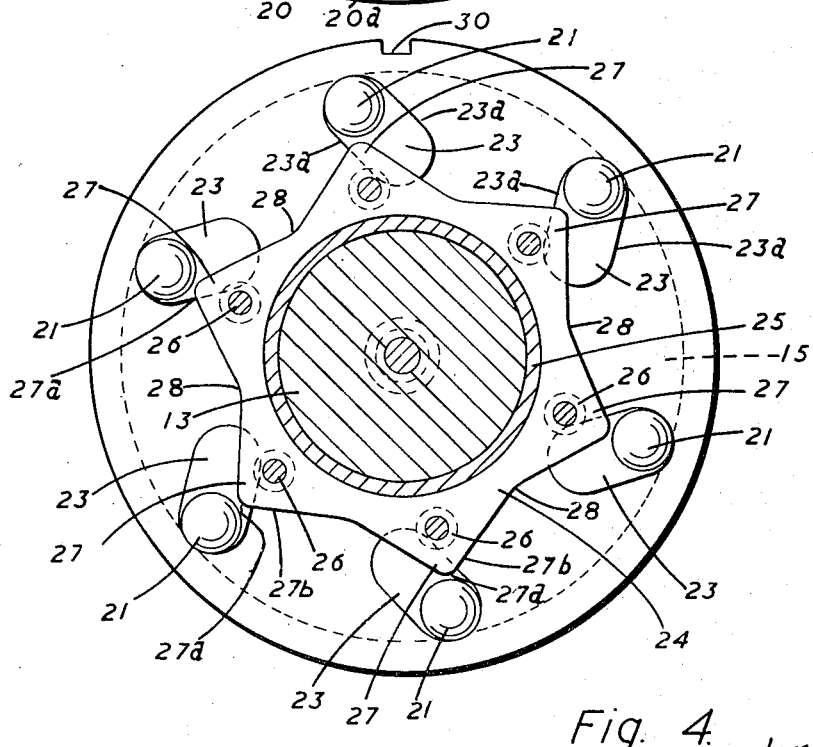

One embodiment of the invention is illustrated in the accompanying drawings, wherein:

FIGURE 1 is a cross-sectional side elevation of one form of over-load clutch in accordance with this invention showing the clutch in the engaged position;

FIGURES 2 and 3 are sectional views on the lines 2—2 and 3—3 respectively of FIGURE 1;

FIGURE 4 is a view similar to FIGURE 2 but showing the position of the parts with the clutch in the disengaged position.

In the drawings the invention is depicted as applied to an over-load clutch of the general form described and illustrated in the prior specification aforementioned, and in such arrangement the driving member 10 of the clutch instead of being constructed as a V belt pulley is formed as a disc to one end face of which is secured a driving pinion 11. This driving member 10 is mounted for rotation upon a sleeve-like extension 12 of hub 13 carried on driven shaft 14.

The hub 13 has keyed thereon a disc-like driven clutch member 15. The hub 13 at the end thereof opposite to sleeve 12 has secured thereto a thrust collar 16 which engages one end face of a loading spring 17 which as shown, is formed as a spring washer. The opposite end face of spring 17 engages with the adjacent face of the disc-like driven member 15 which member is feather-keyed at 18 to the hub 13 so as to be axially displaceable thereon under the control of the spring 17.

The driving and driven clutch members on their opposed parallel plane faces are formed with a number of torque transmitting openings 19, 20 which as shown are formed as recesses, the outer ends 19a, 20a of which are of frusto-conical form with the mouths thereof having a diameter less than the diameter of the torque transmitting balls 21. The arrangement is such that the balls 21 in the clutch engaged position have line engagement with the mouths of the said recesses, whereby the balls can readily roll out of engagement therewith on more than a predetermined torque being reached.

As the clutch the subject of the present application is designed to transmit relatively high torque e.g. of the order of 8,000 lb. inches, a larger number of balls 21 and torque transmitting openings 19, 20 are provided than in the arrangement illustrated in the prior specification; e.g. with the present specification six balls together with six torque transmitting openings in each of the two clutch members may be provided with the balls having their centres on a pitch circle diameter of 4" considering the clutch engaged.

The arrangement is such that with the clutch engaged the opposed plane faces of the two clutch members 10, 15 are relatively spaced by a distance somewhat greater than the radius dimension of each ball.

Within the space so provided between the two clutch members is a ball retaining element 22 of disc-like form having a thickness substantially half the aforementioned spacing and formed with six ball receiving slots 23. Each slot 23 is disposed at an inclination to the direction of rotation of the adjacent part of element 22 and has a length substantially equal to twice the diameter of the balls 21 with the sides 23a of the slots of semi-circular configuration having a radius of curvature somewhat greater than the radius dimension of the balls, so that the slots 23 have a width which is somewhat greater than the diameter of the balls 21.

Conveniently the major axis of cross section of each slot is inclined at 45° to a radius line passing through the central axis of the clutch and intersecting with the centre of each ball considering the balls at the inner end of their slots in the clutch engaged position, i.e. in engagement with the then-in-register two sets of ball positioning recesses.

The ball retaining element 22 is in face-to-face engagement with the adjacent face of the driven member 15 considering the clutch in the engaged position, but the driven member is free to move axially away from the retaining element 22 when clutch disengagement occurs. Then under these conditions the retaining element is quite free to rotate relative to each of the two members 10, 15 of the clutch.

The driving member 10 adjacent its inner periphery has secured to its aforementioned plane end face adjacent the driven member 15 a ball displacing element in the form of a star cam 24 of annular configuration which extends around a shoulder 25 on the adjacent end face of the driving member 10, to which member it is secured by a number of axially extending screws 26 provided one adjacent each of the lobes 27 of the cam, which screws also serve to secure the driving member 10 to the pinion 11. The axial thicknesses of the star cam 24 and ball retaining element 22 are such as to be spaced axially apart from one another considering the balls 21 in their engaged position, thus ensuring that the balls are then subjected to the full pressure of spring 17.

Each of the dwells 28 of the star cam 24 are respectively in register in a radial sense with one of the driving member openings 19, the arrangement being such that when the clutch is engaged with the balls 21 each received partially within one of the driving member openings 19, the inner side of each ball is spaced out of contact with the adjacent star cam dwell 28 as shown at 28a in FIGURE 2, i.e. which is nearest to the ball retaining element 22. Such spacing ensures that the balls 21 are free to disengage from their respective openings 19 and 20 by a simple rolling movement without having sliding engagement with the star cam dwells 28 while so doing, which would result in undesirably rapid wear of these parts.

The number of dwells and lobes on the star cam 24 are equal to the number of balls 21, and the apex 27a of each lobe 27 is spaced radially from the clutch axis by a distance greater than the radius of the pitch circle on which the two sets of torque transmitting openings 19, 20 have their centres located.

The arrangement ensures that when the driving member 10 has over-run the driven member 15 by a short distance following the disengagement of the balls 21 from the mouths of the openings 19, 20 the flanks 27b of the lobes 27 commence to engage with the balls to force these in an outward direction along the slots 23 of the retaining element 22 through a distance sufficient to bring the balls fully out of register with the torque transmitting openings 19, 20 as shown in FIGURE 4.

With the above described arrangement, disengagement of the clutch occurs in the general manner described in the prior specification, but as soon as the driving member 10 has over-run the driven member 15 by a short distance, so that the balls 21 are engaged by the flanks 27b on the lobes 27 of the star cam 24 which is now rotating with the driving member 10 and relative to the driven member 15, the balls 21 as above described are constrained to move to the outer ends of the slots 23 in the retaining element 22 and are thus positively brought fully out of register with the torque transmitting openings 19, 20 of the two clutch members 10, 15.

Thus the balls now within the outer ends of the inclined slots 23 are now in pressure engagement with the opposed plane faces of the two clutch members of which the driven member is still being urged towards the driven member under the pressure of the loading spring.

The radius dimension of the star cam lobes is such that in this position the tips 27a of the lobes 27 clear the adjacent balls when within the outer ends of the slots, so that the driving member 10 to which the star cam 24 is connected is quite free to rotate relative to the driven member 15 without fouling the balls 21 when these are at the outer ends of the slots.

Under these conditions the driven member 15 will now be at rest and the balls 21 will merely have simple rolling engagement in a circular path with the opposed plane faces of the two clutch members 10, 15, the balls rolling bodily about the clutch axis at a peripheral velocity half the velocity of rotation of the driving member.

As the retaining element 22 is itself free to rotate relative to the two clutch members, it will itself rotate at the same velocity as the velocity of rolling movement of the balls which will rub lightly on the sides of the slots 23 in the retaining element without applying any pressure thereto, since the retaining element is quite free and there is no question of it being subjected to any part of the clutch loading.

To enable the clutch to be re-engaged, the peripheries of the retaining element 22 and driving member 10 are formed with a clutch engaging slot 29, 30 respectively and re-engagement is effected by aligning the two slots with one another. These two slots 29, 30 are so disposed that when aligned the inner end of each ball retaining slot 23 is itself aligned with a driving member opening 19 and star cam dwell 28, so as to permit of the balls moving to the inner ends of the slots 23. The ball retaining element and driving member are temporarily located in this position against relative rotational movement by inserting a tommy bar or other suitable tool in the two aligned slots 29, 30 whereupon the driving and driven clutch members are rotated relatively in a direction such that the balls 21 by their rolling engagement with the two clutch members are constrained to move inwardly of the slots 23, the inner ends of which slots 23 by the aforementioned tool inserting operation are held in register with the torque transmitting openings 19 of the driving member so that as soon as the torque transmitting openings 20 of the driven member are brought into register with those of the driving member by the said relative rotational movement, the clutch re-engages under its spring loading 17.

Provision is made for adjusting the torque at which disengagement occurs by mounting the thrust collar 16 on the adjacent end of the hub 13 for adjusting movement along the length of the hub e.g. by screw threading this portion of the hub and providing the collar 16 with an internal corresponding thread.

What we claim is:

1. An over-load clutch comprising driving and driven clutch members mounted for rotation about a common axis in axially spaced relationship so as to present axially opposed faces, said members having torque transmitting openings provided in said axially opposed faces, torque transmitting balls engaging in said openings to transmit torque from the driving to the driven clutch member, means mounting said two clutch members for relative axial displacement away from one another against loading means urging said members towards one another, a ball retaining element disposed between the two clutch members mounted for free rotational movement about said axis relative to both members, said element having ball receiving slots, one portion of each of which slots is in one relative position of the two clutch members in register with a torque transmitting opening in both of said clutch members, with one end of each slot being out of register with the torque transmitting openings of both clutch members for all relative rotational positions thereof, one of said two clutch members having connected thereto to rotate therewith ball displacing means comprising a plurality of ball engaging abutments spaced circumferentially about the axis of rotation of the clutch and adapted on relative rotational movement occurring between the two clutch members each to engage with one of the several balls and positively to displace the same in a direction along the length of the associated slot in the ball retaining element to a position in which the balls are out of register with the torque transmitting openings in both the driving and the driven clutch member.

2. An over-load clutch comprising driving and driven clutch members mounted for rotation about a common axis in axially spaced relationship so as to present axially opposed faces, said members having torque transmitting openings provided in said axially opposed faces, torque transmitting balls engaging in said openings to transmit torque from the driving to the driven clutch member, means mounting said two clutch members for relative axial displacement away from one another against loading means urging said members towards one another, a ball retaining element disposed between the two clutch members mounted for free rotational movement about said axis relative to both members, said element having ball receiving slots, one portion of each of which slots is in one relative position of the two clutch members in register with a torque transmitting opening in both of said clutch members, with one end of each slot being out of register with the torque transmitting openings of both clutch members for all relative rotational positions thereof, one of said two clutch members having connected thereto to rotate therewith a star cam having a plurality of lobes corresponding in number to that of the balls and of the slots in the ball retaining element and spaced angularly by the same pitch distance as that of the slots, with the dwells of the star shaped cam being each in radial alignment with a corresponding torque transmitting opening of the clutch member to which the star cam is connected, the arrangement being such that on clutch disengagement occurring, each of the several balls is engaged by the flank of a corresponding star cam lobe to displace the ball positively along the slots of the ball retaining element into the out of register position in which the star cam is free to rotate relative to the ball retaining element and balls therein.

3. An over-load clutch according to claim 2, wherein one of the two members of the clutch is mounted upon a hub to rotate therewith, on which hub is mounted for rotational movement the other of the two clutch members with the clutch displacing means being connected to said latter member to rotate therewith relative to said hub.

4. An over-load clutch according to claim 3, wherein the driving and driven members of the clutch, together with the ball retaining element and star cam are each of annular disc-like configuration with the hub extending therethrough and with the disc-like driven member of the clutch being mounted on the hub to rotate therewith about which the driving member of the clutch is adapted to rotate when over-load conditions are obtained, there being means connecting the star cam to the driving member of the clutch.

References Cited by the Examiner
UNITED STATES PATENTS

| | | | |
|---|---|---|---|
| 2,902,864 | 9/1959 | Digby | 64—29 X |
| 3,095,955 | 7/1963 | Orwin | 192—56 |

DAVID J. WILLIAMOWSKY, *Primary Examiner.*

A. T. McKEON, *Assistant Examiner.*